United States Patent [19]
Pettet et al.

[11] Patent Number: 5,375,666
[45] Date of Patent: Dec. 27, 1994

[54] VIBRATION ISOLATOR FOR A PORTABLE POWER TOOL

[75] Inventors: Glenn A. Pettet; Rory Bringhurst; Lakhbir S. Suchdev, all of Phoenix, Ariz.

[73] Assignee: Ryobi Outdoor Products, Chandler, Ariz.

[21] Appl. No.: 96,763

[22] Filed: Jul. 23, 1993

[51] Int. Cl.[5] ............................................. A01D 34/67
[52] U.S. Cl. ..................................... 173/162.1; 30/276
[58] Field of Search .......................... 173/162.1, 162.2; 30/276

[56] References Cited

U.S. PATENT DOCUMENTS

| | | | |
|---|---|---|---|
| 1,048,099 | 12/1912 | Robertson | 173/162.1 X |
| 3,224,473 | 12/1965 | Dobbertin et al. | 173/162.1 X |
| 3,934,344 | 1/1976 | Inaga . | |
| 4,391,041 | 7/1983 | Porter-Bennett . | |
| 4,759,128 | 7/1988 | Katoh et al. | 30/276 |
| 4,817,738 | 4/1989 | Dorner et al. | 173/162.1 |
| 4,819,742 | 4/1989 | Driggers | 173/162.2 |
| 4,825,548 | 5/1989 | Driggers | 173/162.2 X |

*Primary Examiner*—Rinaldi I. Rada
*Attorney, Agent, or Firm*—Brooks & Kushman

[57] ABSTRACT

A hand held power tool is disclosed comprising an internal combustion engine, a workpiece driven by the engine, a boom extending between the engine and the workpiece, a clutch housing, a starter module, and an isolator. The clutch housing, the starter module and the isolator are disposed in a rearward section of the power tool housing the boom. The isolator is preferably formed of thermoplastic rubber, and is disposed between the clutch housing and the starter module. The clutch housing and the starter module are connected by fasteners extending therebetween, but the fasteners do not penetrate the isolator. Because the isolator is soft mounted, the isolator effectively dampens engine vibration forces to the operator and avoids local stresses which might otherwise lead to premature failure.

7 Claims, 9 Drawing Sheets

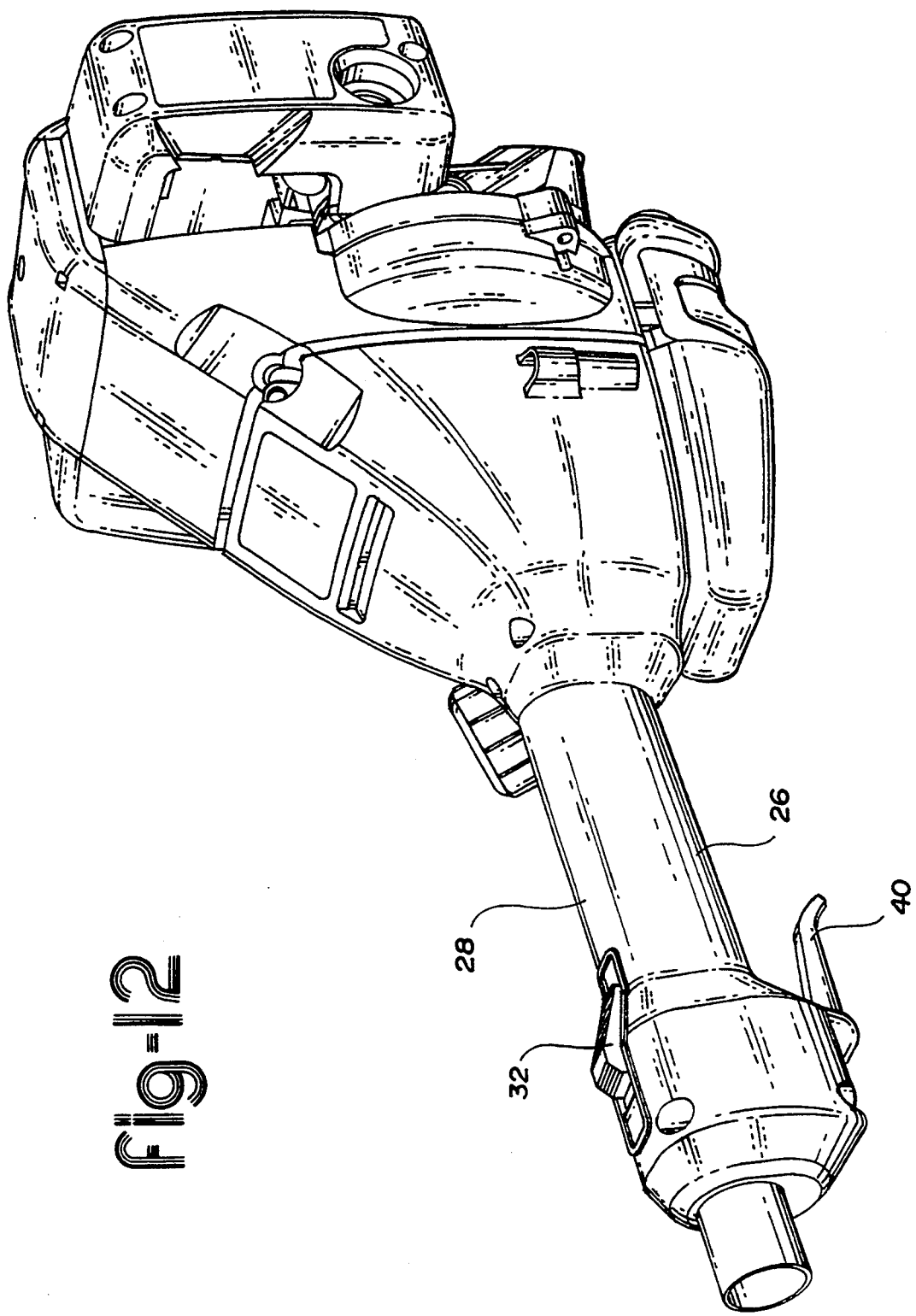

VIBRATION ISOLATOR FOR A PORTABLE POWER TOOL

TECHNICAL FIELD

This invention relates to hand held power tools, and more particularly to an isolator for dampening the transmission of engine vibrations to the operator of a hand held power tool.

BACKGROUND ART

Hand held power tools such as line trimmers are typically powered by electric motors or small, single cylinder internal combustion engines. In the case of power tools equipped with engines, some means is usually provided for ceasing operation of the engine when the operator no longer desires to work with the unit. One popular method of accomplishing this is through the use of an on/off or kill switch which grounds the supply of electricity to the spark plug. U.S. Pat. No. 4,286,675 to Tuggle, for example, discloses a narrow profile power handle for a line trimmer and the like having an ignition kill switch situated near a hand grip portion of a rear handle. For power tools such as line trimmers in which the engine is normally carried behind the operator, however, an ignition kill switch disposed proximate the engine would require the operator to remove one or both hands from their normal operating positions in order to manipulate the switch.

Another problem frequently associated with hand held power tools is the transmission of engine vibrations to the operator. Although the power tools may be provided with padded handles or other low cost devices to dampen some of the vibrations, an improved system for isolating the entire engine from the operator and the remainder to the power tool would be desirable.

SUMMARY OF THE INVENTION

The present invention is a hand held power tool such as a line trimmer comprising an internal combustion engine, a workpiece driven by the engine, and a boom extending between the engine and the workpiece. A clutch housing, a starter module, and an isolator are disposed in a rearward section of the power tool housing the boom. The isolator is preferably formed of thermoplastic rubber, and is disposed between the clutch housing and the starter module. The clutch housing and the starter module are connected by fasteners extending therebetween, but the fasteners do not penetrate the isolator. Because the isolator is soft mounted, the isolator effectively dampens engine vibration forces to the operator and avoids local stresses which might otherwise lead to premature failure.

Accordingly, it is an object of the present invention to provide a power tool of the type described above which dampens the transmission of engine vibrations to the operator.

This and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 12 is a perspective view of the head assembly of the line trimmer.

BEST MODE FOR CARRYING OUT THE INVENTION with reference to the drawing, the preferred embodiments of the present invention will be described. FIGS. 1 through 7 and 12 show a line trimmer 10 according to the present invention for use in performing lawn and garden work. The line trimmer 10 includes a single cylinder two- or preferably four-cycle internal combustion engine 12 housed in a power head assembly 13, a workpiece 14 driven by the engine, an elongated tube or boom 16 extending between the engine and the workpiece, and an actuator 18.

Figure 1:
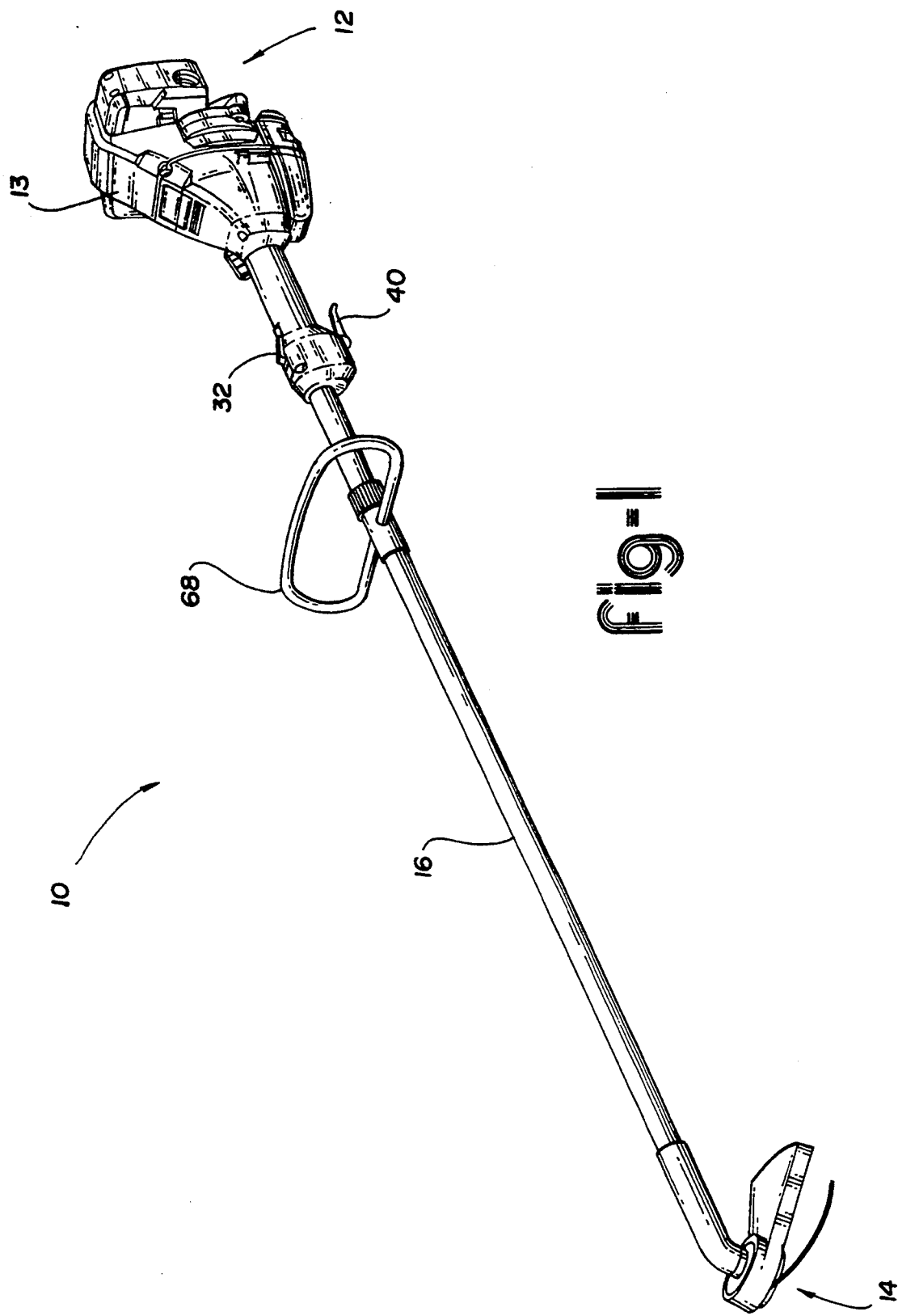
FIG. 1 is a perspective view of a hand held line trimmer according to the present invention.
Figure 2:
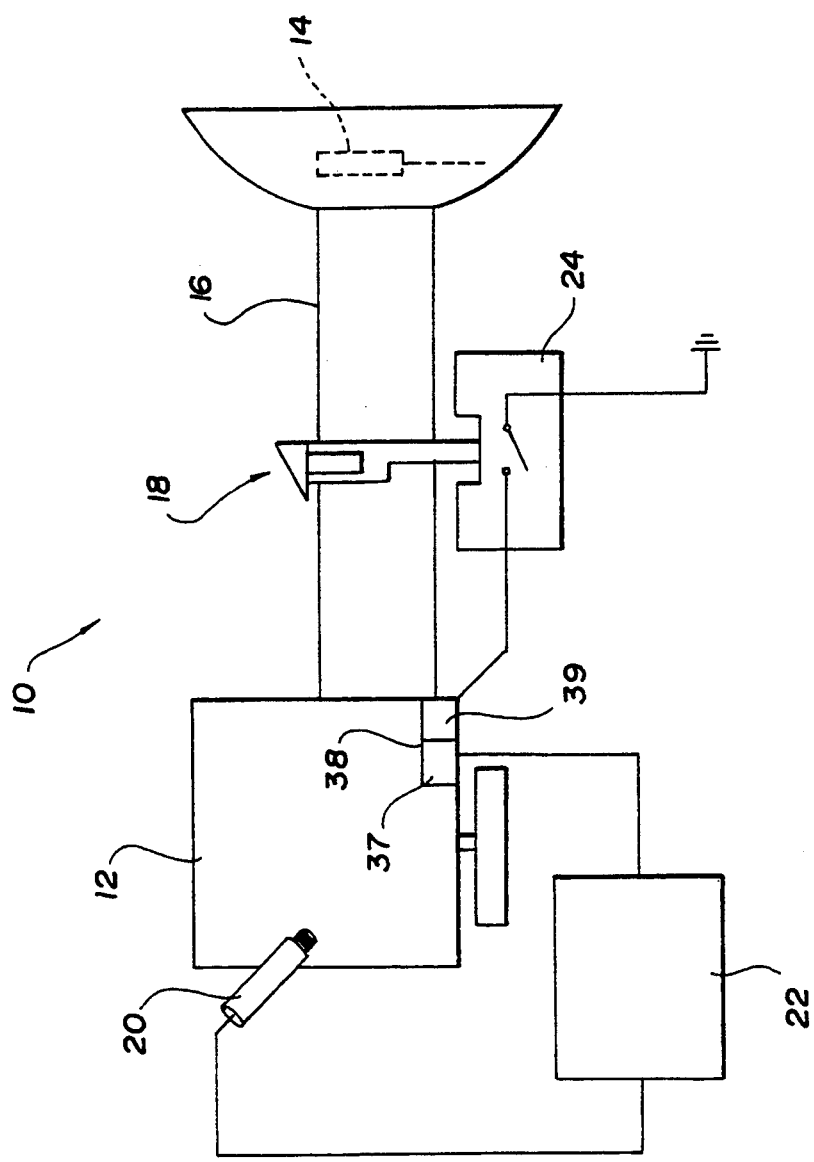
FIG. 2 is a schematic view of the hand held line trimmer.
Figure 3:
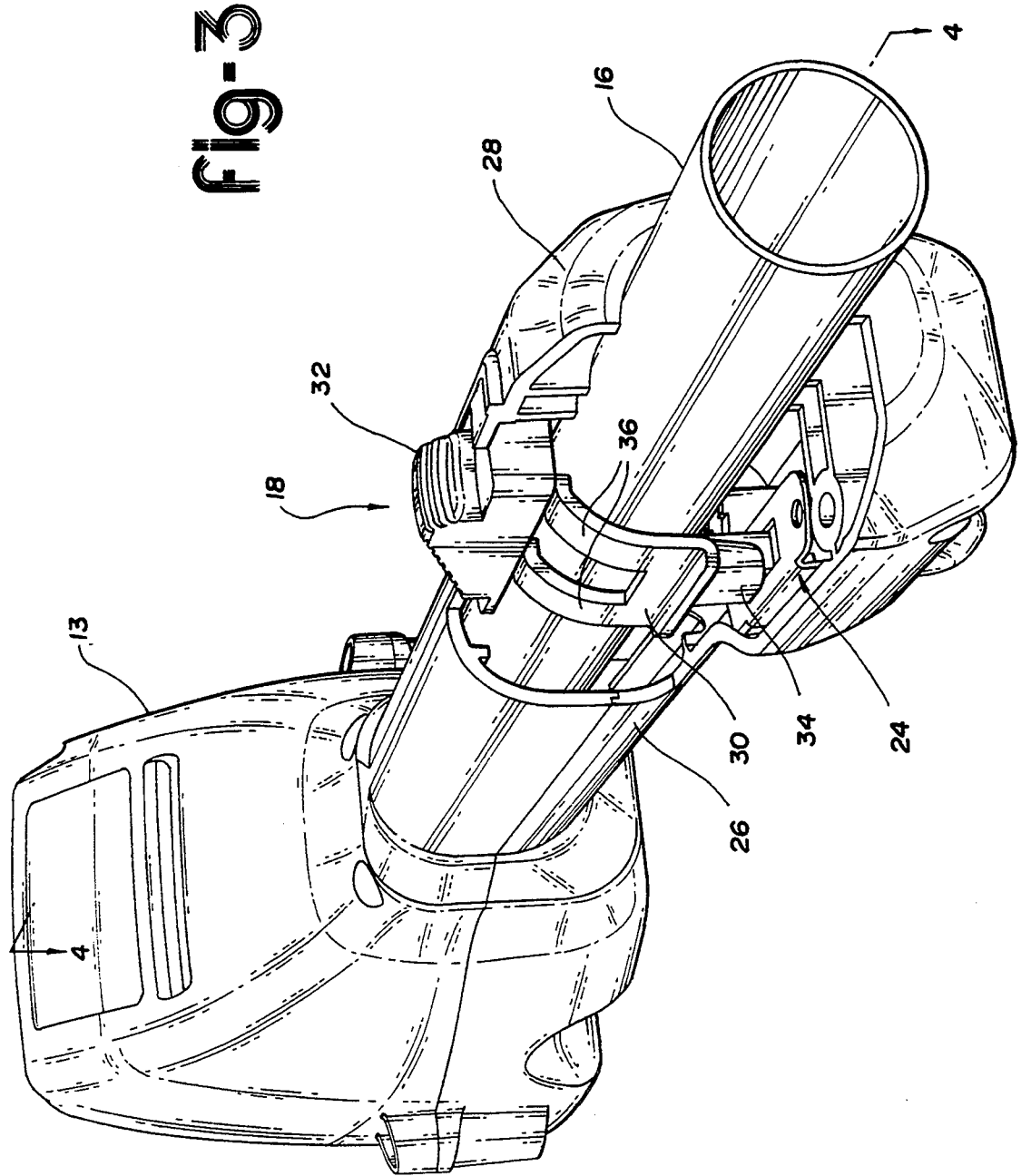
FIG. 3 is a cut away perspective view of a section of the line trimmer including an actuator assembly for an engine kill switch.

The ignition system for the engine 12 includes a spark plug 20, an electronic ignition control module 22, and an on/off or kill switch 24 wired in an electrical circuit. The spark plug 20 provides a spark to combust a fuel-air mixture in the cylinder of the engine 12, while the electronic ignition control module 22 includes a microprocessor for controlling the timing of the sparks generated by the spark plug 20, as is well known.

The kill switch 24 is positively mounted in the lower of two housing halves 26 and 28 under the boom 16, which is preferably cylindrical and has a uniform thickness, generally circular cross-section throughout its length. With the kill switch mounted in a relatively protected position beneath the boom and inside the housing halves, the actuator 18 enables the operator of the power tool 10 to trip the kill switch 24 and thereby to stop the operation of the engine 12. The actuator 18 comprises a collar 30, a fingerpiece or thumbpiece 32, and an extension 34, all of which are preferably formed as a unitary, injection molded plastic piece. The collar 30 includes opposite depending, relatively flexible legs 36 which slidingly engage the exterior of the boom 16 such that the collar is disposed therearound. The boom 16 serves to smoothly guide and retain the actuator 18 during assembly and operation of the unit.

The fingerpiece 32 is connected to the top of the collar 30 and is movable with the collar between a first or normal operating position and a second position. In the first position with the fingerpiece 32 slid rearwardly toward the engine 12, the electrical circuit is closed between the high voltage side 37 of an ignition coil 38 of the engine and the electronic ignition control module 22 such that electricity can be supplied to the spark plug 20. When the operator wishes to terminate operation of the engine 12, the fingerpiece 32 is simply slid forwardly away from the engine to move the collar 30.

The extension 34 depends from the collar 30 and is adapted to engage the kill switch 24 such that when the fingerpiece 32 is moved to the second position, the kill switch closes an electrical circuit including the low voltage side 39 of the ignition coil 38 and a ground. This grounds the electrical circuit between the spark plug 20 and the electronic ignition control module 22, but it should be understood that any other method of interrupting or breaking the supply of electricity to the spark plug. Of course, the actuator and kill switch arrangement is equally applicable to an engine equipped with a conventional magneto to supply electrical current to the spark plug. Because one of the operator's hands normally grips the housing halves 26 and 28 to operate a throttle trigger 40, the fingerpiece 32 is easily accessible and movable in either the forward or rearward directions. Engine operation can thus be terminated without the operator removing his or her hands from their operating positions.

Figure 4:
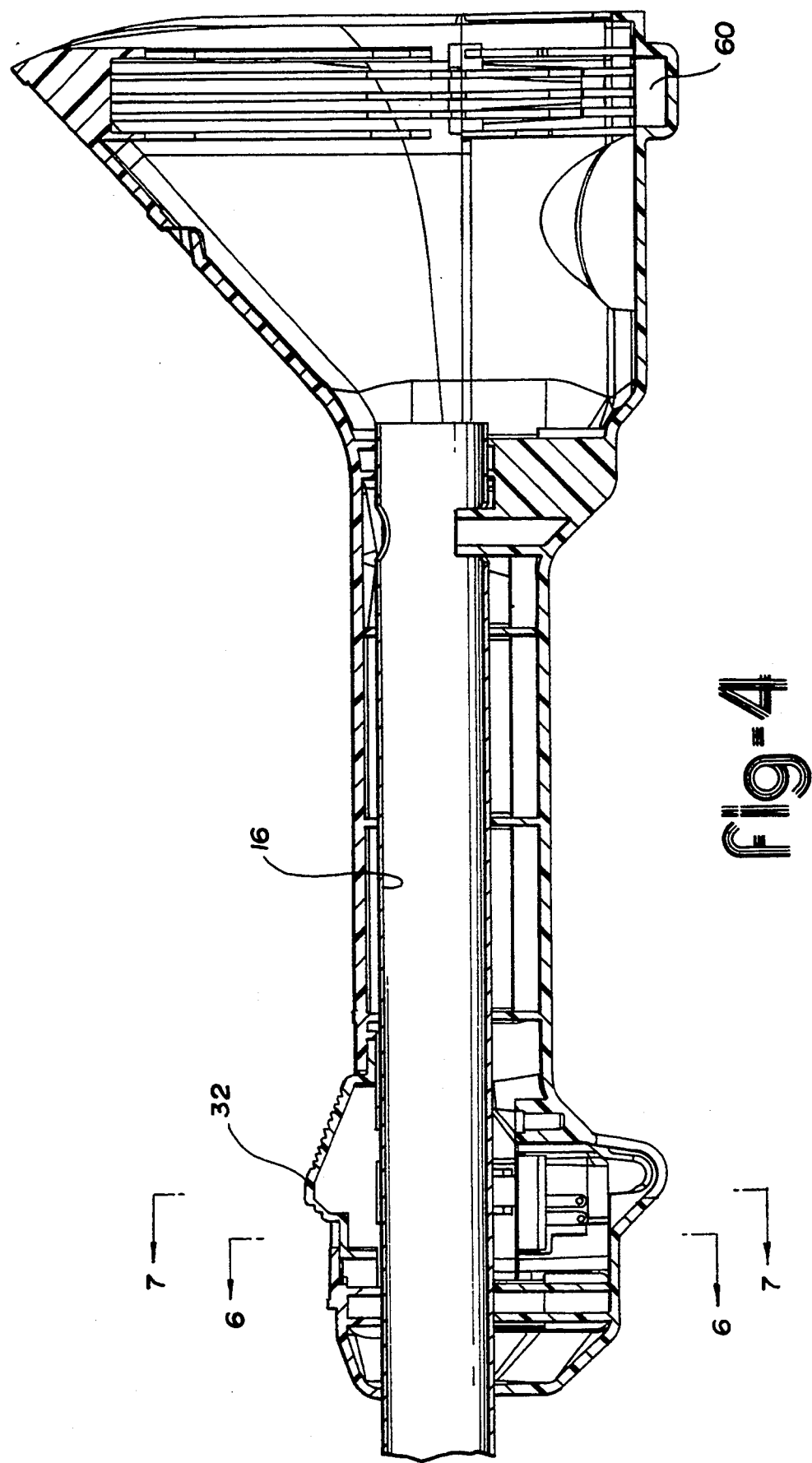
FIG. 4 is a cross-sectional view of the line trimmer taken along line 4—4 in FIG. 3.
Figure 5:
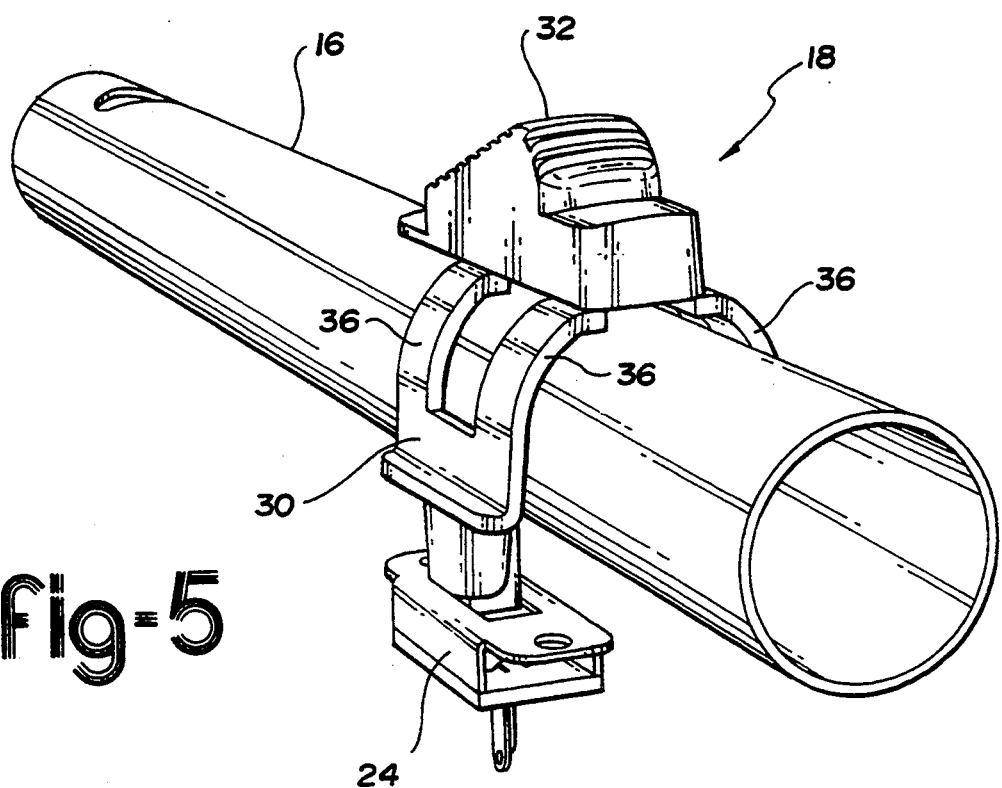
FIG. 5 is a perspective view of the actuator assembly, boom and kill switch shown in FIG. 2.
Figure 6:
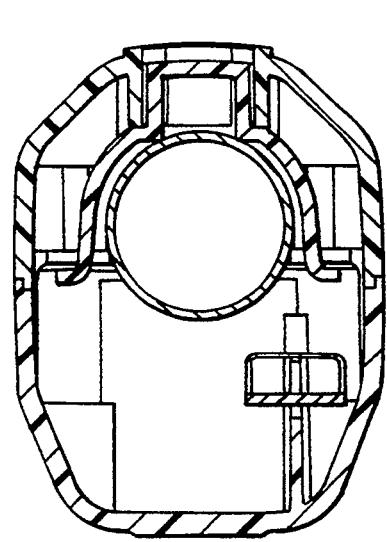
FIG. 6 is a cross-sectional view taken along line 6—6 in FIG. 4.
Figure 7:
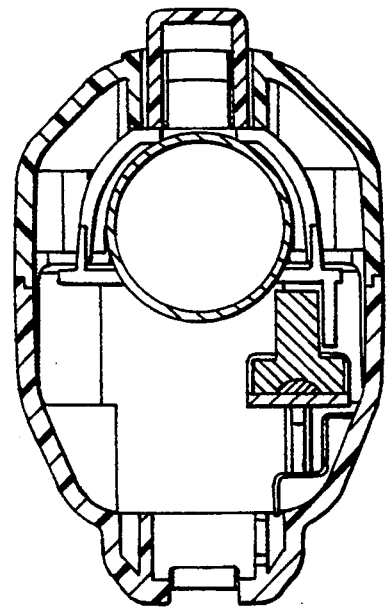
FIG. 7 is a cross-sectional view taken along line 7—7 in FIG. 4.

The power tool 10 has an arbitrary upright orientation in which the fingerpiece 32 points upwardly and the boom 16 lies generally in a horizontal plane as shown in FIG. 4 through the central axis of the boom. The upright orientation should be distinguished from the normal operating position in which the boom 16 is angled downwardly to the ground from near the operator's waist. In the upright orientation, the fingerpiece 32 and the kill switch 24 are disposed on opposite sides of the horizontal plane. Although the boom 16 of the present invention is preferably substantially straight throughout its entire length, the boom can alternately be formed with one or more straight sections joined together at various angles, or can be formed with one or more curved sections.

The actuator of the present invention offers several advantages, including the provision of a high quality feel with a relatively inexpensive switch, and the ability to locate the kill switch and its related wiring in the bottom assembly half of the power tool. The kill switch is thus more accessible for repair or replacement, but does not fall out during more common types of service. Furthermore, the actuator is guided and retained by the boom, and can be formed from a resiliant material which allows the part to be "popped" on and off of boom for easy assembly and disassembly.

Figure 8:
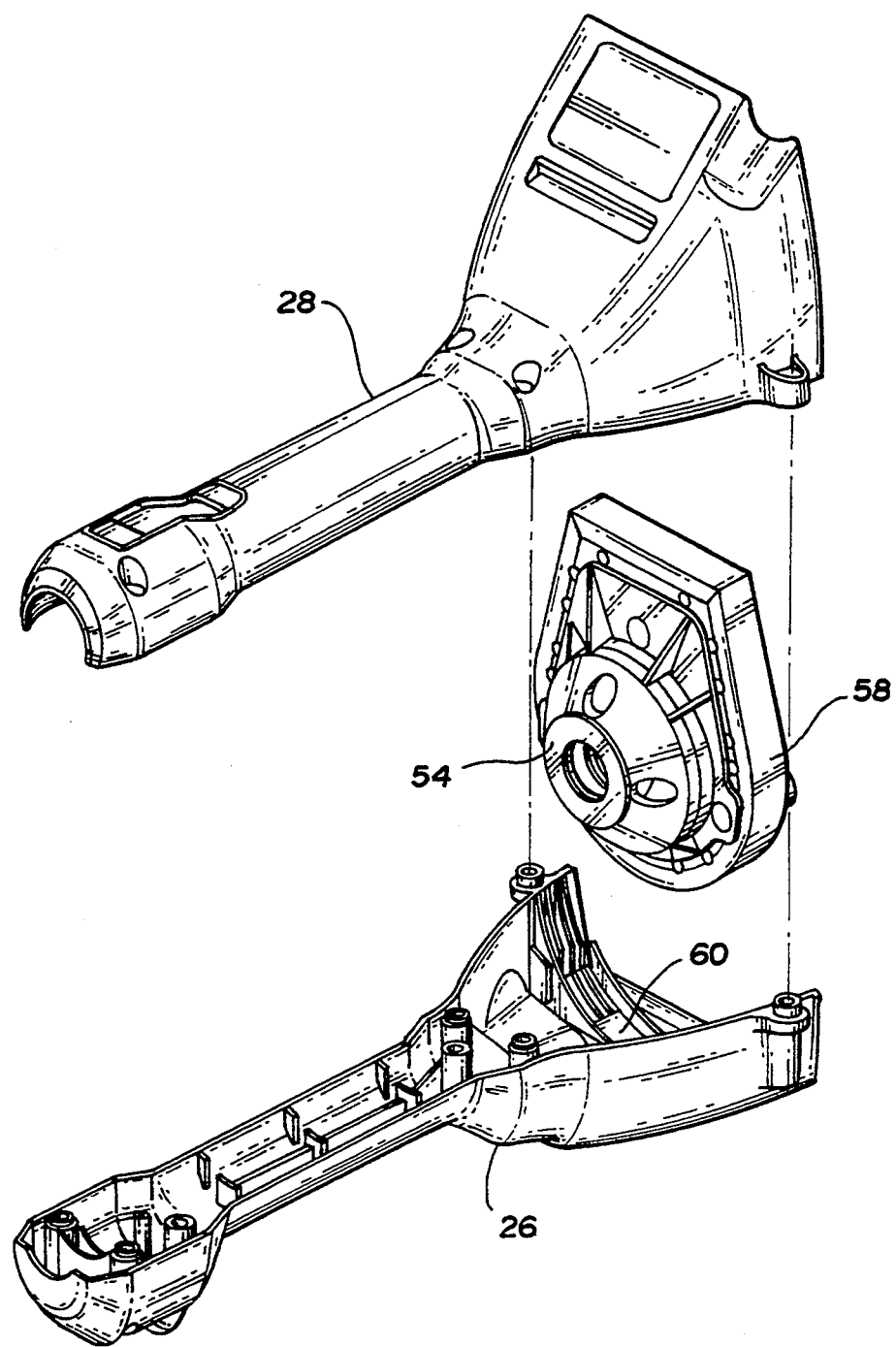
FIG. 8 is an exploded perspective view of a section of the line trimmer including a clutch housing and an isolator.
Figure 9:
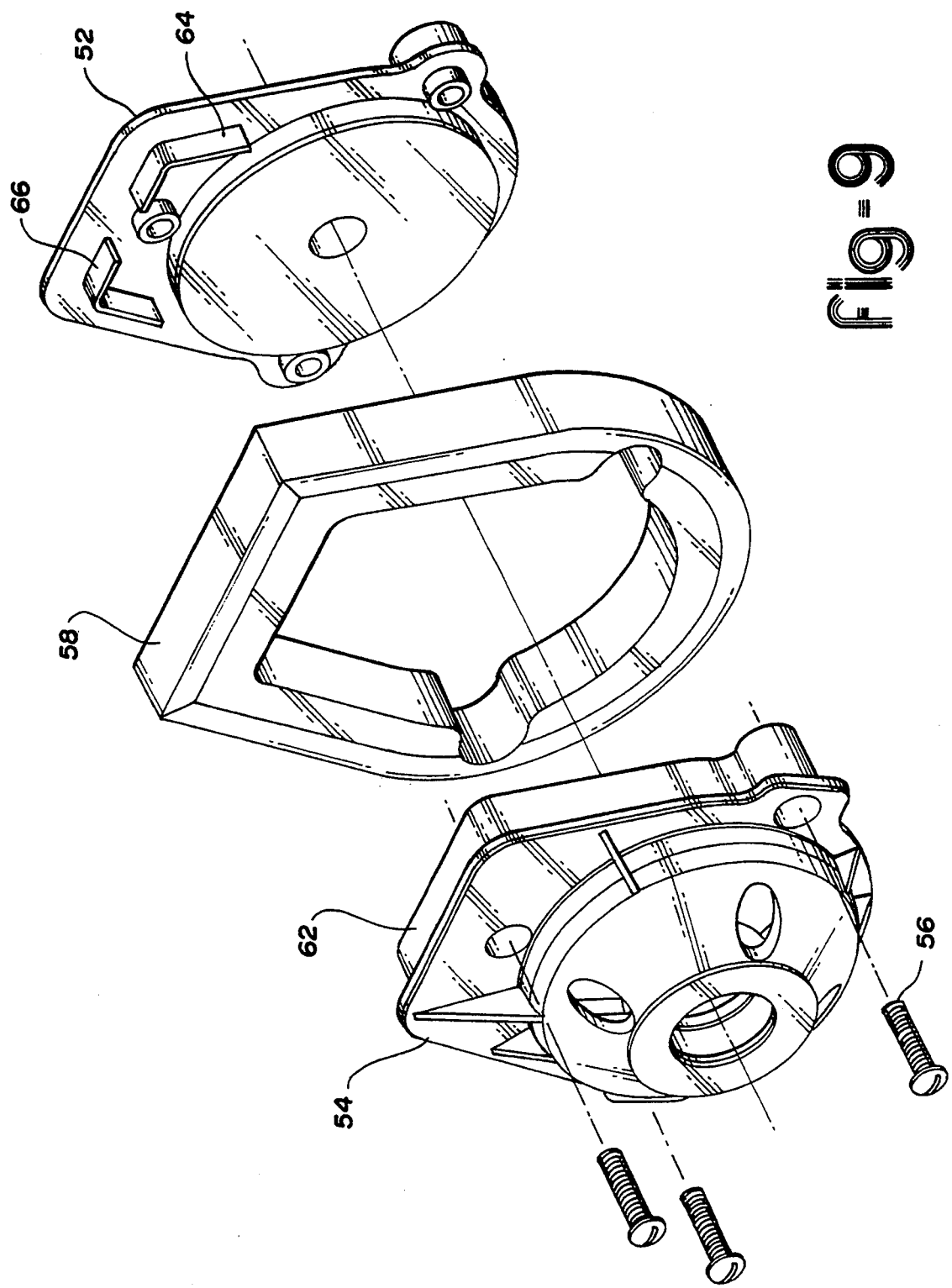
FIG. 9 is an exploded perspective view of the clutch housing, isolator and a starter housing.

FIGS. 8 and 9 show a boom section 50, including the boom 16 and its upper and lower housing halves 26 and 28, extending between the internal combustion engine 12 and the workpiece 14. When assembled, a starter module or housing 52 is connected to the engine 12 and a clutch housing 54, which encloses a clutch drum, is attached to the starter housing by fasteners 56 extending therebetween. A thermoplastic rubber (TPR) isolator 58 is disposed between the clutch housing 54 and the starter module 52, and extends outwardly beyond their perimeters so that the outer periphery of the isolator is retained in a channel 60 formed in the upper and lower housing halves. The inner periphery of the isolator 58 is retained by a flange 62 extending from the clutch housing 54, and near its upper lefthand and righthand corners by flanges 64 and 66 extending from the starter housing 52. The isolator 58 is preferably about one-half to three-quarters of an inch thick, and preferably has a generally uniform thickness throughout its perimeter. The isolator 58 thus separates the handle 68 and boom from the engine clutch and starter modules.

The isolator 58 functions to dampen the transmission of engine vibration forces to the boom section. Because the boom section is held by the operator, engine vibrations are also dampened before they are transmitted to the operator. The fasteners 56 do not penetrate the isolator 58, and thus the isolator is held in place by the channel 60 in the upper and lower housing halves. Because the isolator 58 is completely soft mounted, i.e. it has no direct feature receiving an increased load due to a mechanical attachment, local stresses are avoided which might lead to a premature failure of the isolator.

The isolator 58 is of a size sufficient to create effective total engine support. This support enables damping of engine vibrations regardless of their direction or moment. For instance, various vibrations produced by the endocrine may include vibration due to the unbalanced couple of a half crank or cantilevered crankshaft engine, the X-Y forces due to an unbalanced reciprocating mass, and the tangential torque reaction around the z-axis of a two-cycle or four cycle engine.

Figure 10:
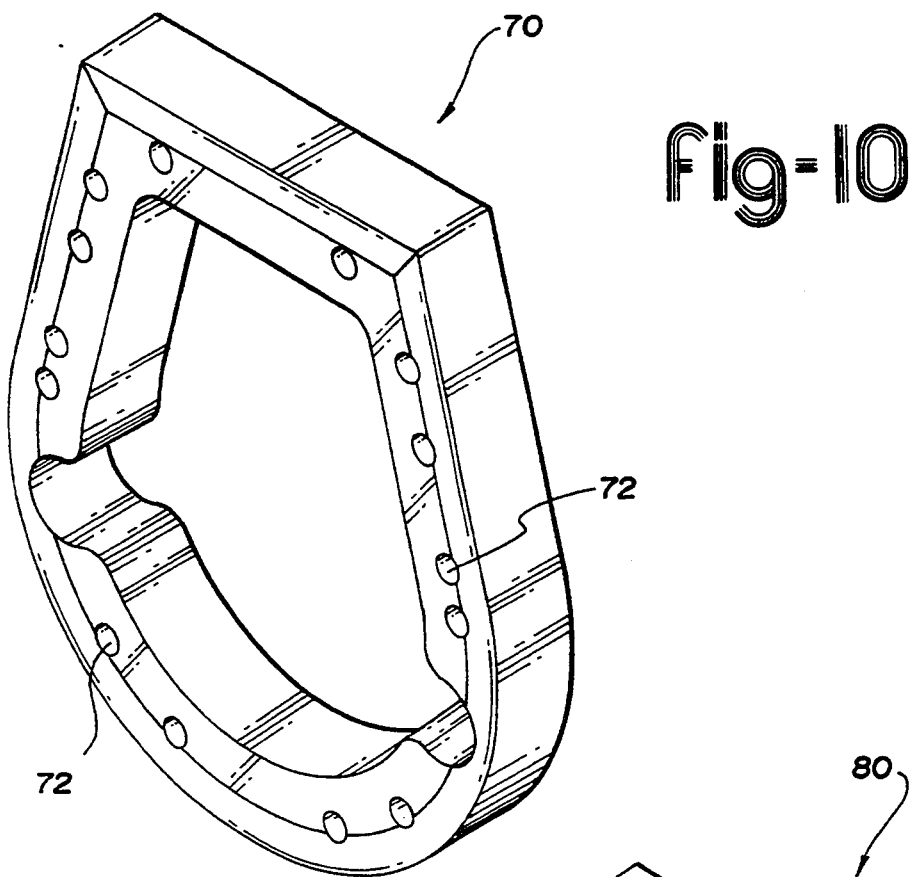
FIG. 10 is a perspective view of an alternative embodiment of the isolator.
Figure 11:
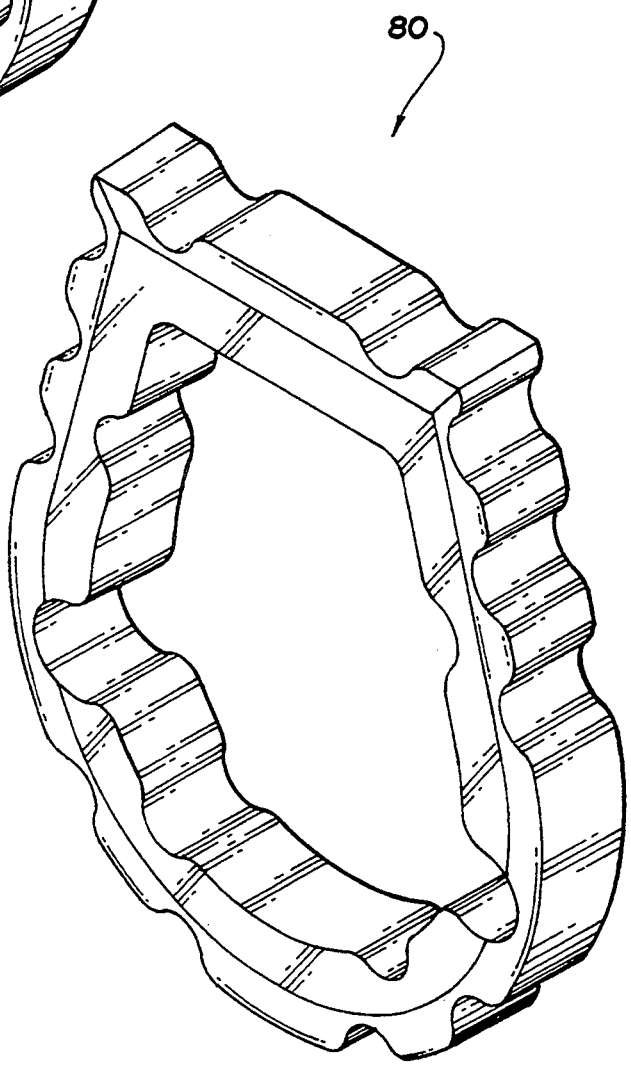
FIG. 11 is a perspective view of another alternative embodiment of the isolator.

FIG. 10 shows an alternative embodiment 70 of the isolator having a plurality of holes 72 distributed around the perimeter. The holes 72 create a higher shear component to enable proper resonance and decrease transmissibility. FIG. 11 shows another alternative embodiment 80 of the isolator which accomplishes the same objective.

Although the present invention has been described in connection with a hand held line trimmer, it should be appreciated that the present invention is equally applicable to other hand held power tools such as chain saws, etc. It should be understood that while the forms of the invention herein shown and described constitute preferred embodiments of the invention, they are not intended to illustrate all possible forms thereof. It should also be understood that the words used are words of description rather than limitation, various changes may be made without departing from the spirit and scope of the invention disclosed.

We claim:

1. A hand held power tool comprising:
   an internal combustion engine;
   a workpiece driven by the internal combustion engine;
   a boom section extending between the internal combustion engine and the workpiece;
   a starter module connected to the engine;
   a clutch housing connected to the starter module forwardly of the starter module and away from the engine; and
   an isolator disposed between the clutch housing and the starter module, the isolator comprising rubber.

2. The power tool of claim 1 wherein the isolator has a uniform thickness.

3. The power tool of claim 1 wherein the isolator comprises thermoplastic rubber.

4. The power tool of claim 1 wherein the isolator has a plurality of holes therethrough.

5. The power tool of claim 1 wherein the clutch housing and the starter module are connected by fasteners extending therebetween.

6. The power tool of claim 5 wherein the fasteners do not penetrate the isolator.

7. The power tool of claim 1 wherein the isolator is retained in a channel formed in the housing.

* * * * *

UNITED STATES PATENT AND TRADEMARK OFFICE
CERTIFICATE OF CORRECTION

PATENT NO. : 5,375,666  
DATED : December 27, 1994  
INVENTOR(S) : Pettet et al.

It is certified that error appears in the above-identified patent and that said Letters Patent is hereby corrected as shown below:

Column 4, line 18, replace "endocrine" with --engine--.

Signed and Sealed this

Eighteenth Day of April, 1995

BRUCE LEHMAN

*Commissioner of Patents and Trademarks*

*Attest:*

*Attesting Officer*